United States Patent [19]

Inada et al.

[11] Patent Number: 5,157,512
[45] Date of Patent: Oct. 20, 1992

[54] VIDEO TAPE RECORDER HAVING BUILT-IN CAMERA DETACHABLE HAND GRIP MEMBER

[75] Inventors: Shinsaku Inada; Eiji Ohshima, both of Tokyo; Hideaki Io, Kanagawa; Masayoshi Morikawa, Tokyo, all of Japan

[73] Assignee: Sony Corporation, Tokyo, Japan

[21] Appl. No.: 751,650

[22] Filed: Aug. 26, 1991

Related U.S. Application Data

[63] Continuation of Ser. No. 587,537, Sep. 21, 1990, abandoned, which is a continuation of Ser. No. 193,138, May 6, 1988, abandoned, which is a continuation of Ser. No. 866,971, May 27, 1986, abandoned.

[30] Foreign Application Priority Data

| May 27, 1985 | [JP] | Japan | 60-78896[U] |
| May 27, 1985 | [JP] | Japan | 60-78897[U] |
| May 27, 1985 | [JP] | Japan | 60-78898[U] |
| May 27, 1985 | [JP] | Japan | 60-78899[U] |

[51] Int. Cl.$^5$ .......................................... H04N 5/782
[52] U.S. Cl. ..................... 358/335; 358/906; 360/33.1
[58] Field of Search ............ 358/335, 906, 909; 360/6, 33.1; 369/53; 354/288 A–288 F, 288 H, 288 M, 288 P, 288 V

[56] References Cited

U.S. PATENT DOCUMENTS

| 3,833,758 | 9/1974 | Ferrari | 358/906 X |
| 4,470,077 | 9/1984 | Komine | 358/906 X |
| 4,499,504 | 2/1985 | Edakubo et al. | 358/906 X |
| 4,507,689 | 3/1985 | Kozuki et al. | 358/906 X |
| 4,530,015 | 7/1985 | Yanagida et al. | 358/906 X |
| 4,531,159 | 7/1985 | Takubo et al. | 358/906 X |
| 4,539,601 | 9/1985 | Komine | 358/906 X |
| 4,547,815 | 10/1985 | Kimura | 358/906 X |
| 4,571,627 | 2/1986 | Stempeck | 358/906 X |
| 4,589,747 | 5/1986 | Nakayama et al. | 354/288 X |
| 4,625,243 | 11/1986 | Takubo | 358/906 X |

OTHER PUBLICATIONS

Sony Service Manual, CCD-V8, Mar. 1985, Cover and p. 146.

*Primary Examiner*—Wayne R. Young
*Attorney, Agent, or Firm*—Hill, Van Santen, Steadman & Simpson

[57] ABSTRACT

A combination video tape recorder and camera includes a main body having a video tape recorder and a television camera, and a separable hand grip secureable to a side wall of the main body. The hand grip carries a view finder for the camera and a battery for supplying operational power to the video tape recorder and the television camera.

12 Claims, 7 Drawing Sheets

VIDEO TAPE RECORDER HAVING BUILT-IN CAMERA DETACHABLE HAND GRIP MEMBER

This is a continuation of application Ser. No. 587,537, filed Sep. 21, 1990, which is a continuation of application Ser. No. 193,138, filed May 6, 1988, which is a continuation of application Ser. No. 866,971, filed May 27, 1986, all now abandoned.

BACKGROUND OF THE INVENTION

1. Field of the Invention

The present invention relates generally to a video tape recorder with a camera and more particularly is directed to a video tape recorder having a built-in camera.

2. Description of the Prior Art

In a typical home video recorder having a built-in video camera, the user generally holds a hand grip portion of this built-in camera type video tape recorder with his right hand while operating the camera to take video images.

In prior art video tape recorders having a built-in camera, the hand grip portion is provided on a side wall of the video tape recorder. This causes the overall thickness of the video tape recorder to be relatively large. As a result, when the user carries this video tape recorder having a built-in camera in its non-operational mode, this video tape recorder can not be put into a carrying case such as an attaché case or the like that is relatively thin. Instead, the user has to carry such a video tape recorder in a larger, special case, which is generally unwieldy and often identifiable by others as a camera case.

In the conventional built-in camera type video tape recorder, a television camera section, a video tape recorder section and a view finder section are substantially formed in combination as a single unit. Therefore, the operational modes or status of the television camera section and the video tape recorder section can easily be displayed in an optical or electronic type view finder.

When a built-in camera type video tape recorder is designed to be small in size and hence easily portable, if the television camera section and the video tape recorder section are preferably formed into a combination form as a main body, and a hand grip is formed to include therein an optical type view finder and a battery, if both the main body and the hand grip section are coupled together to take a video picture, the problem arises that the operational status of the television camera section and the video tape recorder section cannot be optically displayed within the optical type view finder.

Of course, if a number of electrical contacts are provided on the main body and the hand grip section so as to be contacted with one another when both the main body and the hand grip are coupled together, it becomes possible to display the operational status of the television camera section and the video tape recorder section using light emission elements such as LEDs (light emission diode) may be located within the optical view finder. However, in this case, a further problem occurs in that the electrical contacts will easily malfunction, thus making this built in camera type video tape recorder unreliable.

OBJECTS AND SUMMARY OF THE INVENTION

Accordingly, it is a general object of this invention to provide a video tape recorder having a built-in camera.

An object of this invention is to provide a video tape recorder having a built-in camera in which a main body section and a hand grip section are easily detachable from each other so that upon carrying, the overall thickness of the built-in camera type video tape recorder can be reduced and thereby the built-in camera type video tape recorder can be easily kept in a thin case or the like and made suitable for portable use.

Another object of this invention is to provide a video tape recorder having a built-in camera in which a view finder and a battery are incorporated in a hand grip section and the main body section and the hand grip section are separable at their side walls.

A further object of this invention is to provide a video tape recorder having a built-in camera in which the status of the various operational elements in the main body section can be optically displayed by an optical type status indication section provided at the face, in the view finder area, and in which a hand grip section is detachable from a main body section.

A still further object of this invention is to provide a video tape recorder having a built-in camera, in which a light guide section is mounted on a face in which a hand grip section is detachable from a main body section, whereby the optical display of an optical type status indication section is carried out within a view finder incorporated in the hand grip section.

According to one aspect of the present invention, there is provided a video tape recorder having a built-in camera comprising:

a) a main body having a video tape recorder and a television camera; and b) a hand grip separably mounted on a side wall of said main body, said hand grip carying a view finder and a battery for supplying operational power to said video tape recorder and said television camera.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

An embodiment of a video tape recorder having a built-in camera according to the present invention will hereinafter be described with reference to the attached drawings.

Figure 1:
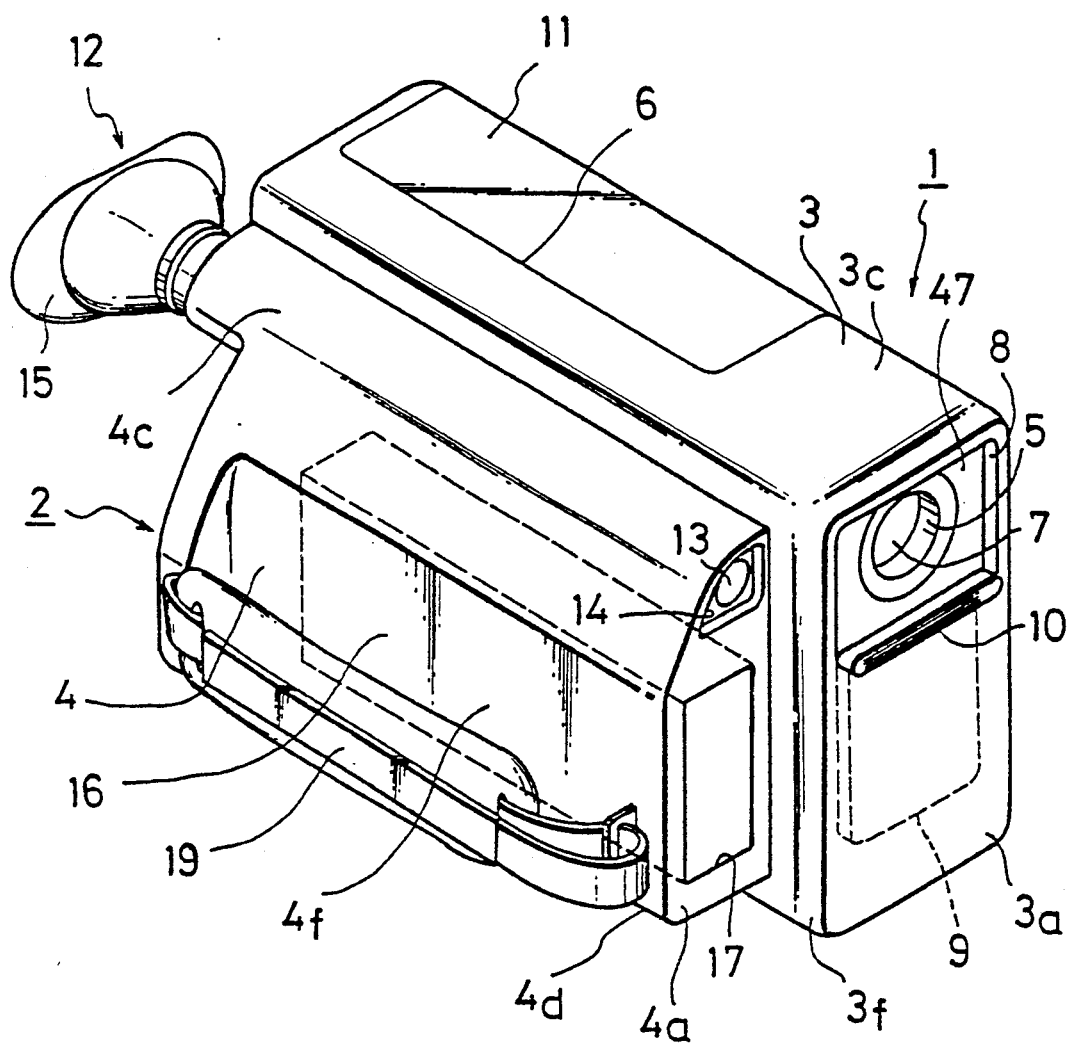
FIG. 1 is a perspective view of an embodiment of a video tape recorder having a built-in camera according to the present invention, seen from its right-front direction.
Figure 2:
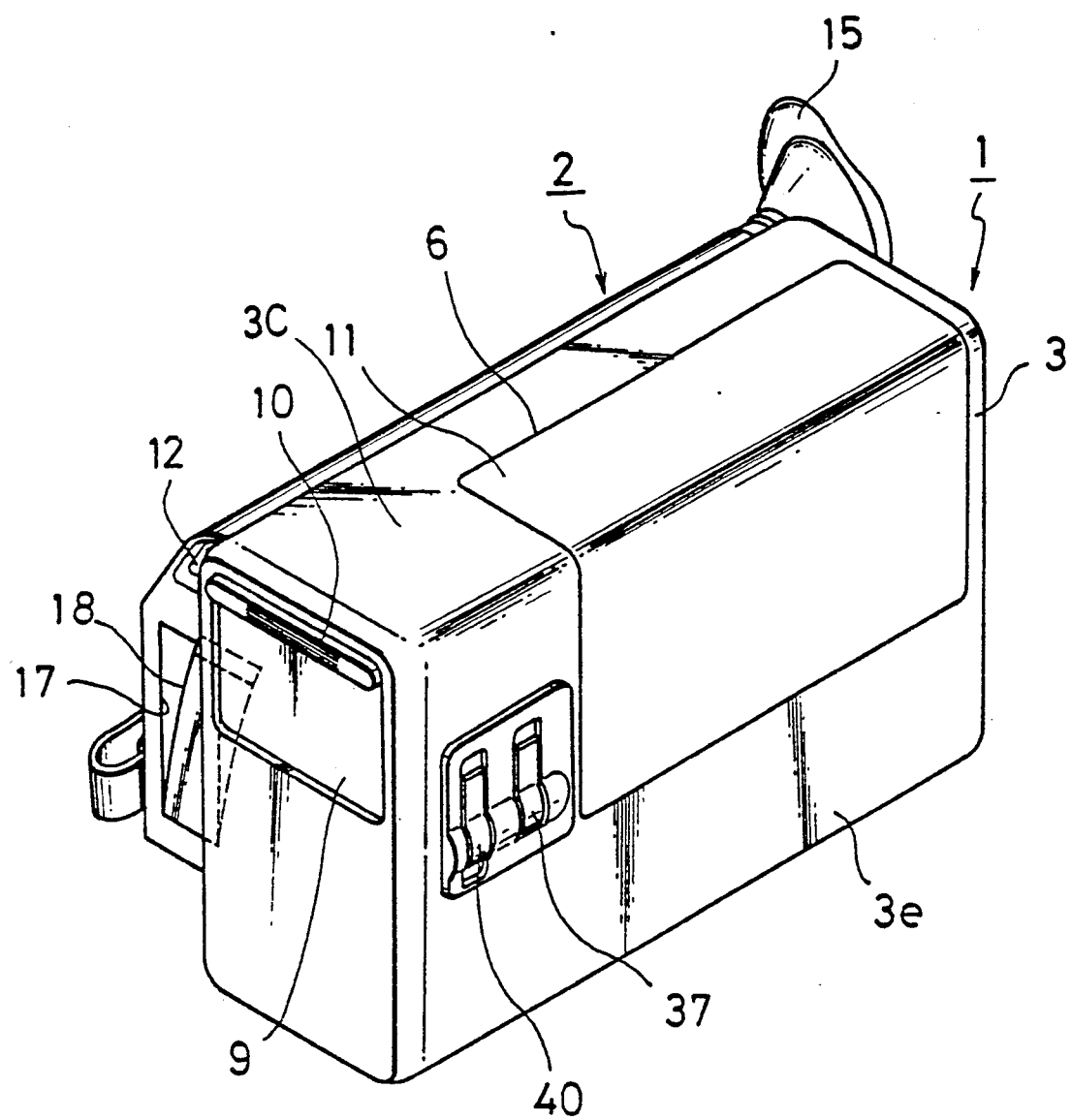
FIG. 2 is a like perspective view of the embodiment of the video tape recorder having a built-in camera according to the present invention, seen from its left-front direction.
Figure 3:
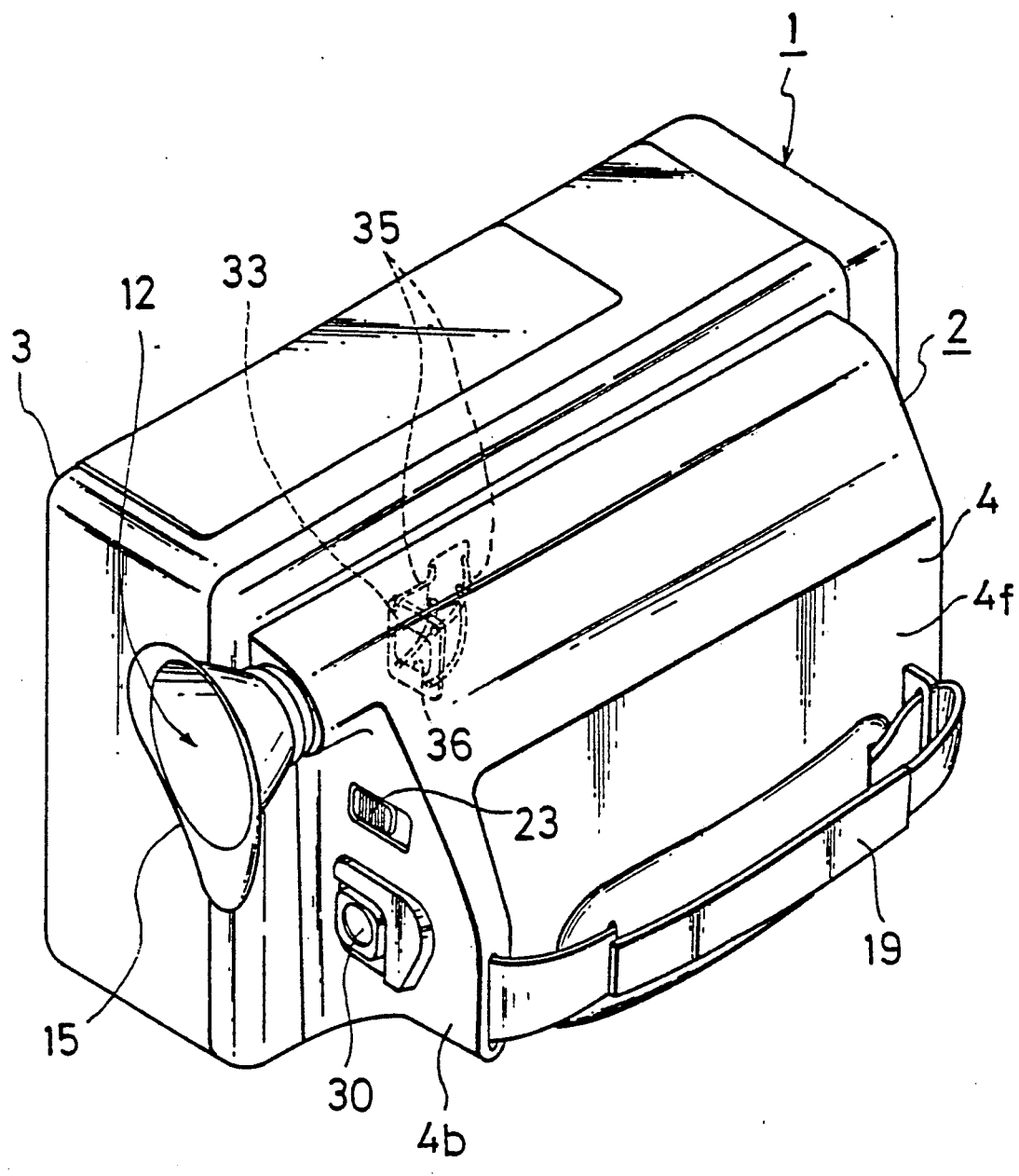
FIG. 3 is a perspective view of the embodiment of the video tape recorder having a built-in camera according to the present invention, seen from its right-rear direction.

Referring to FIG. 1 through FIG. 3, the video tape recorder having a built-in camera according to this embodiment is formed of a main body 1 and a hand grip 2 which are separable. Casings or housings 3 and 4 of the main body 1 and the hand grip 2 are all made of synthetic resin. The main body housing 3 is formed substantially as a rectangular solid shape and also the hand grip housing 4 is formed substantially as a rectangular solid shape. In this case, however, the hand grip housing 4 is curved from its upper wall 4c through its right side wall 4f to its lower wall 4d so as to fit the palm of the right hand of a user.

A television (TV) camera section 5 and a video tape recorder (VTR) section 6 are incorporated in the main body housing 3, respectively. Further, a lens window frame 47 is fixed to a lens window opening 8 of a rectangular shape formed through the upper portion of a front wall 3a of the main body housing 3. An objective lens 7 of the TV camera section 5 faces to the outside through the window frame 47 attached to the lens window opening 8. A dust-proof cover 9 is attached to the rear side of the front wall 3a through appropriate attaching means so as to be slidable in the vertical direction between the front wall 3a and this window frame 47. The upper end edge of this dust-proof cover 9 protrudes slightly beyond the window opening 8 of the front wall 3a and thereby forms a knob 10 of the dust-proof cover 9. The cover 9 can be maintained in a ratchet detent fashion so that it will be held in an open state as shown in FIG. 1 or in the closed state as shown in FIG. 2.

A lid 11 having the same configuration and shape as a part of the main body housing 3 is attached to the main body housing 3 from its upper wall 3c to its left side wall 3e. The lid 11 is made freely rotatable relative to the main body housing 3 with its lower edge as a hinge. When the lid 11 is set in the opened state, a video tape cassette (not shown) is detachably loaded on a cassette compartment portion (not shown) of the VTR section 6.

In the hand grip section 2, an optical type view finder 12 is incorporated in the upper portion of the hand grip housing 4. An objective lens 13 of the optical view finder 12 faces forwardly through a window opening 14 that is formed through the upper portion of the front wall 4a. To the upper end of a rear wall 4b of the hand grip housing 4, there is attached a so-called eye cup 15 made of resilient material. In this case, this optical type view finder 12 is completely independent of the optical system of the objective lens 7 of the television camera section 5.

A rechargeable battery 16 is incorporated within the hand grip housing 4 so as to be freely replaceable. An opening 17 is formed through the front wall 4a of the hand grip housing 4 to permit replacement of rechargeable battery 16. When the rechargeable battery is taken out through the opening 17, the opening 17 may be closed by a lid 18 (see FIG. 2). When the rechargeable battery 16 is inserted into the hand grip housing 4 through the opening 17, the lid 18 is opened with the tip end of the rechargeable battery 16 and pushed back inside. When the rechargeable battery 16 is taken out of the hand grip housing 4, the lid 18 automatically closes the opening 17. FIG. 2 illustrates the lid 18 in the midst of its rising and falling movement. Further, a strap 19 is attached to the hand grip housing 4 in opposing relation to the right side wall 4f. The user can hold the hand grip housing 4 with his right hand, which in turn is held between the strap 19 and the hand grip housing 4.

The right side wall 3f of the main body housing 3 and the left side wall 4e of the hand grip housing 4 are formed as coupled side walls which are secured to each other. On these walls 3f and 4e there are provided coupling means, respectively. This will be described with reference to FIGS. 4 and 5.

Figure 4:
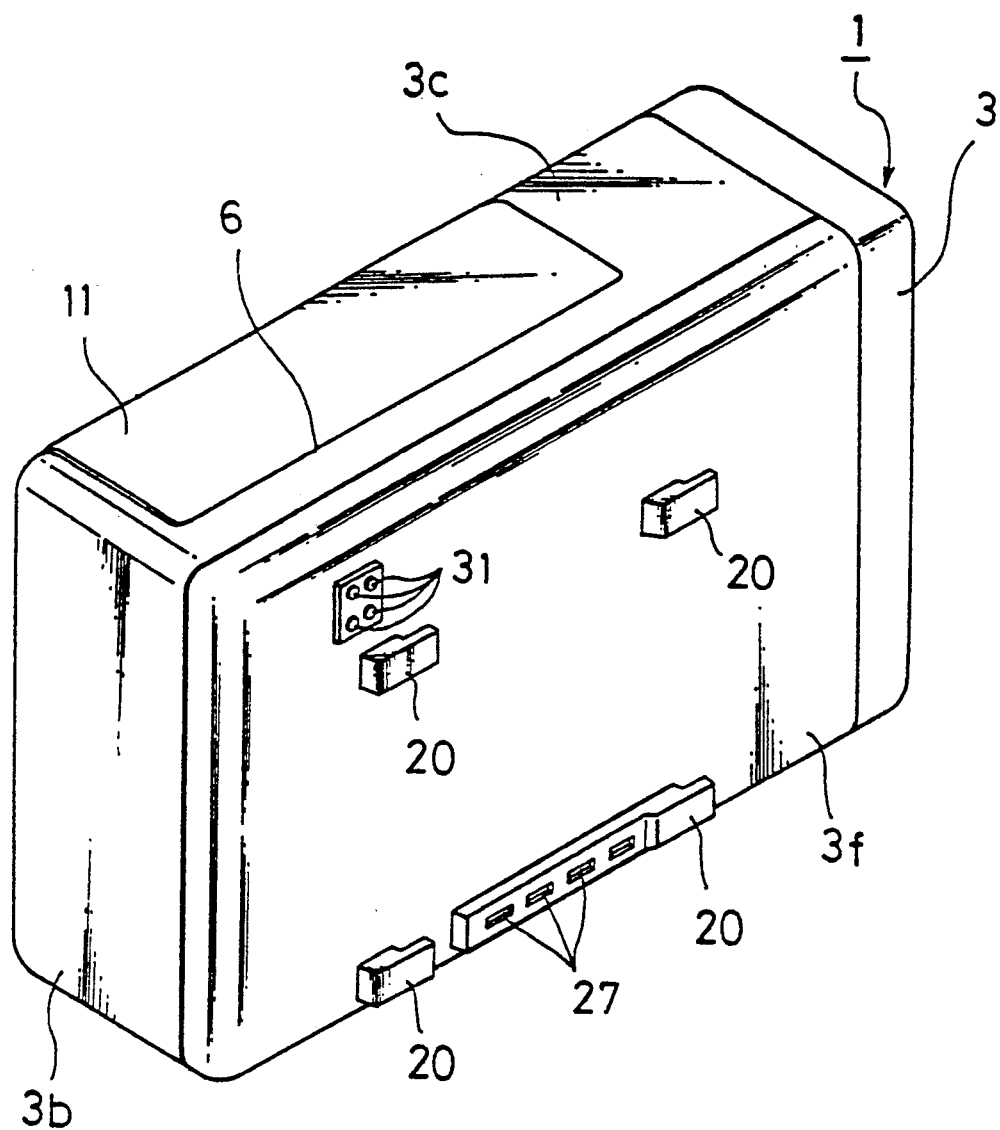
FIG. 4 is a perspective view of its main body seen from its right-rear direction.
Figure 5:
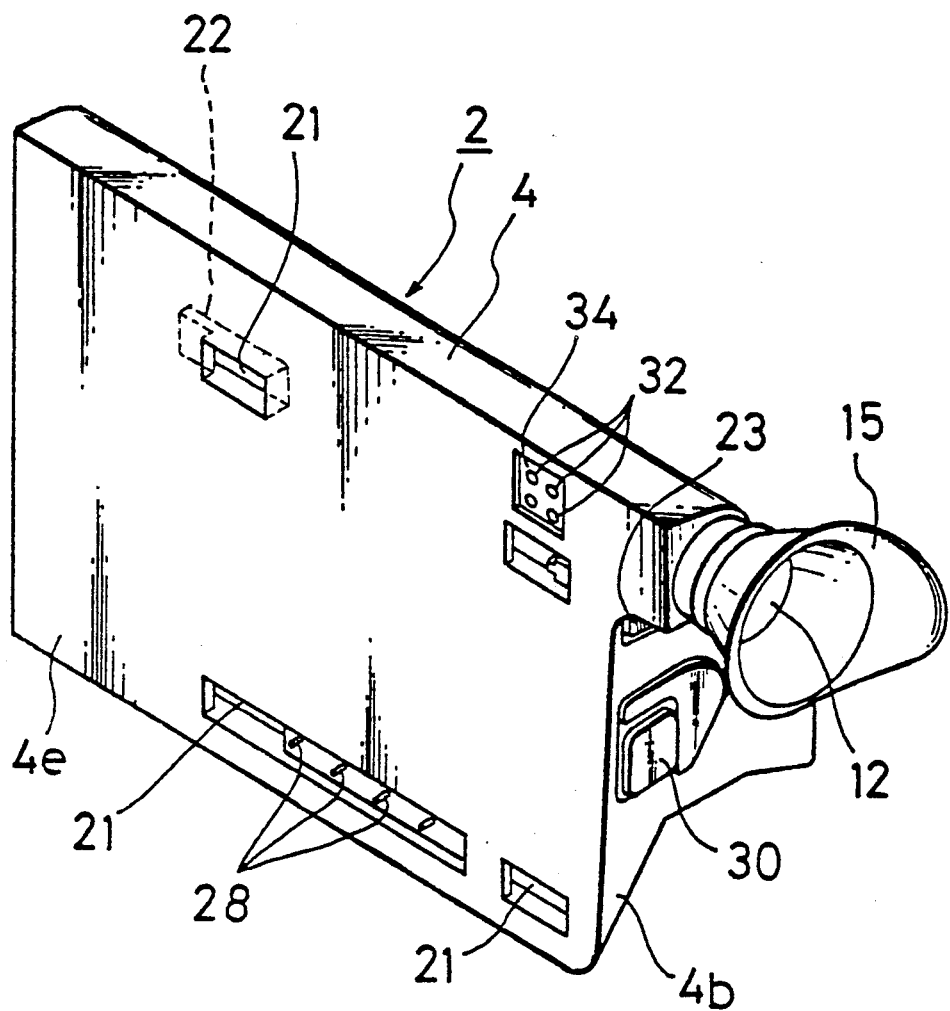
FIG. 5 is a perspective view of its hand grip section seen from its left-rear direction.

Referring to FIGS. 4 and 5, hooks 20 each being of an L-shape are provided on the right side wall 3f of the main body housing 3 at a plurality of places (four places in the illustrated example), each of the hooks 20 facing, or opening the front side of the main body housing 30. On the other hand, through the left side wall 4e of hand grip housing 4, there are formed four recess portions 21 in opposing relation to the above-mentioned four hooks 20. Further, in association with these recess portions 21, there are respectively formed engaging recesses 22 which are extended to the front side of the hand grip housing 4 within the same.

When the respective hooks 20 of the main body housing 3 are engaged with the respective concave portions 21 of the hand grip housing 4, the right side wall 3f of the main body housing 3 and the left side wall 4e of the hand grip housing 4 are closely contacted with each other. Under this state, if the main body housing 3 is slid forward relative to the hand grip housing 4, the tip ends of the respective hooks 20 are inserted into the engaging recesses 22 formed within the respective portions 21 and the main body housing 3 and the hand grip housing 4 are coupled to each other, namely, the main body 1 and the hand grip 2 are coupled with each other.

Figure 6:
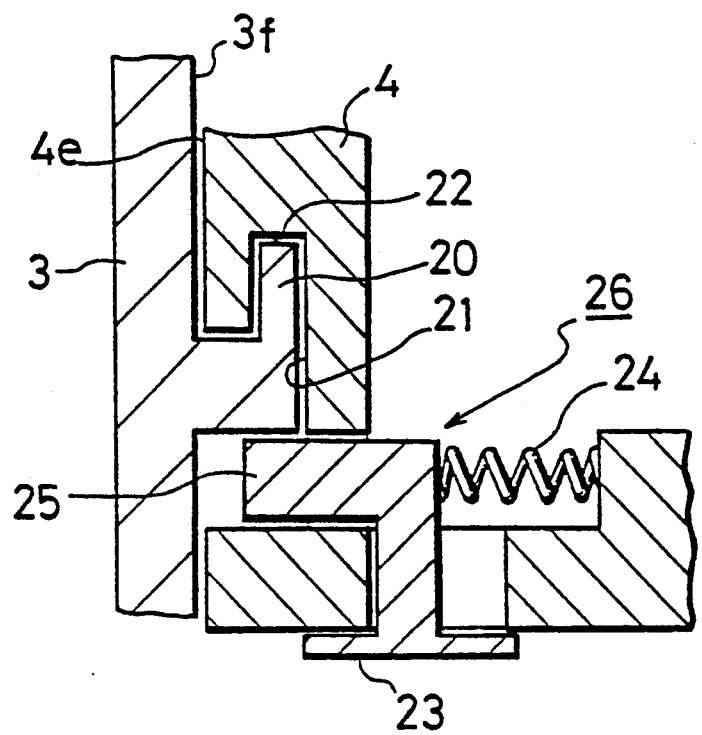
FIG. 6 is a partly sectioned view showing the state that the main body and the hand grip are coupled with each other.

In order to lock the main body 1 and the hand grip 2 in the coupled state locking means are provided. As shown in FIGS. 3 and 6, a lever 23 which is slidable in the right and left direction is attached to the rear wall 4b of the hand grip housing 4. As shown in FIG. 6, this lever 23 is slidably biased to the side of the main body housing 3 by a spring 24 and the tip end of an engaging piece member 25 connected to the lever 23 projects into the concave portion 21 to prevent removal of the hook.

During the coupling of the main body housing 3 with the hand grip housing 4, when the hooks 20 are entered into the recess portions 21, the engaging piece member 25 is moved backward against the biasing force of the spring 24. When, as shown in FIG. 6, the hooks 20 are once entered into the engaging recess portions 22, the engaging piece member 25 is positioned in the recess portion 21 and thereby its associated hook 20 is locked. It is sufficient that such locking means 26 is provided within at least one recess portion 21.

In the condition shown in FIG. 6, when the lever 23 is slid in the opposite direction to the main body housing 3 against the biasing force of the spring 24, the main body housing 3 can be moved backward relative to the hand grip housing 4, and the main body housing 3 and the hand grip housing 4 can be separated from each other.

On the connection side wall, that is, right side wall 3f of the main body housing 3, there are formed a plurality of electrical contacts 27 made of a metal plate (see FIG. 4), while on the left side wall 4e of the hand grip housing 4, there are formed a plurality of electrical contacts 28 made of conductive pins in opposing relation to the respective contacts 27 (see FIG. 5). Accordingly, when the main body housing 3 and the hand grip housing 4 are connected with each other as set forth above, the respective contacts 27 and 28 are contacted electrically so that from the rechargeable battery 16 located within the hand grip housing 4, a power current may flow to the television camera section 5 and the VTR section 6 in the main body housing 3. Further, a push switch or push button 30 for a trigger type switch is mounted on the rear wall 4b of the hand grip housing 4. The signal generated by operating this push buttom 30 is supplied through one of the above-mentioned contacts 27 and 28 to the main body 1. In pratice, when this push button 30 is pushed initially, the video tape recorder and so on are placed in the standby mode, while when it is pushed a second time, the magnetic tape is transported and the recording is carried out.

As shown, an operational status indicating section 31 formed of a plurality of (e.g., four in the illustrated example) light emission elements are mounted on the right side wall 3f of the main body housing 3 for cooperation with a light guide 34 formed on the member 4 at the position facing the indicating section 31, upon assembly.

Specifically, in opposing relation to the respective light emission elements of the operational status indicating section 31, there are formed a plurality of (e.g., four in the illustrated example) window opening 32 and further a rectangular mask 33 is disposed at the focusing position within the optical system of the optical type view finder 12 (see FIG. 3). Then, light giude tubes 35, each made of plastic materials or glass fibers are located between the four corners of the mask 33 and the above-mentioned window openings 32. In other words, one end of each of the light guide tubes 33 is engaged into the window openings 32 and hence the end faces thereof are directly opposed to the operational status indicating section 31 of the main body housing 3, while the other end of each of the light guide tubes 35 is engaged into the window openings which are formed through the four corners of the mask 33.

Figure 7:
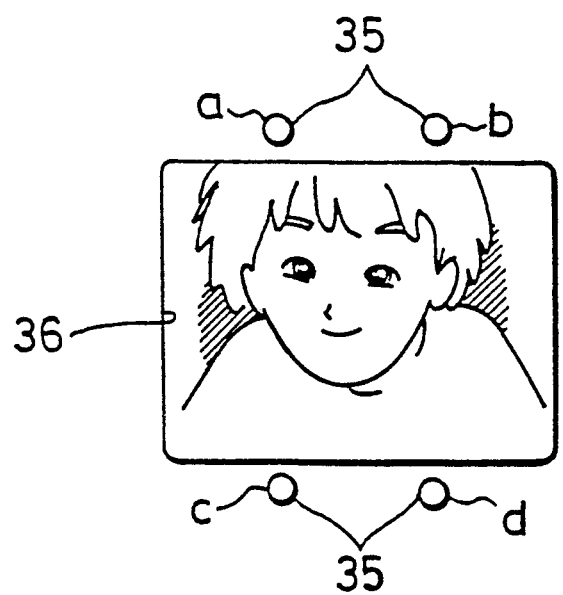
FIG. 7 is a diagram used to explain the status of an optical type view finder as seen by a user.

FIG. 7 shows and example of a picture that is viewed by the user through the optical type view finder 12. Referring to FIG. 7, the end faces of the respective light guide tubes 35 are placed outside a frame 36 of a visual field. Accordingly, when the light emission elements such as LEDs and the like constituting the optical type operational status indication section 31 are lit in response to the respective operational status of the TV camera section 5 and the VTR section 6 within the main body 1, such signal is indicated within the optical type view finder 12.

An example of the operational status indication will be described with reference to FIG. 7, in which respective operational status are designated particularly by reference numerals a to d.

The end face a of the light guide tube is lit when the color temperature is low such as when a picture is taken in the room and so on. In this case, it is sufficient that a color filter within the optical system of the TV camera section 5 in the main body 1 is changed to proper filter. A switching lever 37 shown in FIG. 2 is provided for such switching and this switching lever 37 is slidably moved up and down.

When the end face b is lit, this indicates that the video tape recorder and so on are in standby mode. That is, this end face b is lit by pushing the above-mentioned push button 30 once. When this push button 30 is pushed once more, the end face b becomes unlighted and the end face c is lit to indicate that the video tape recorder and so on are set in the operation mode (in the recording mode). The end face d indicates a status in which the amount of light is in sufficient. In this case, the lack of light amount can be made up for by the use of lighting equipment. Since means for making the respective light emission elements of the operational status indicating section 31 become lighted, to thereby indicate the above-mentioned operational status of the TV camera section 5 and the VTR section 6 within the main body 1, is well known in the prior art, the detailed explanation therefor will not be made. Alternatively, it is, of course, possible to employ light emission elements of different colors.

Figure 8:
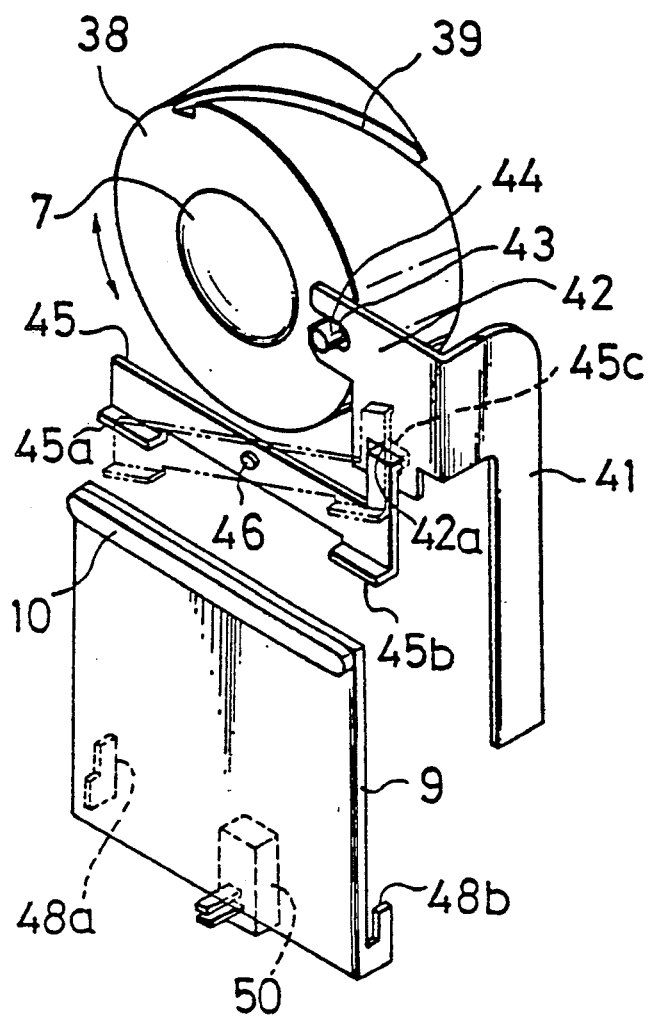
FIG. 8 is a schematic perspective view showing a relationship between a dust-proof cover and a lens of the television camera section.

The TV camera section 5 in the main body 1 may switchably take three positions, namely: wide angle lens mode, standard lens mode, and telephoto lens mode, by moving the objective lens back and forth. As shown in FIG. 8, into a helical groove 39 formed on the outer peripheral surface of a cylinder 38 of the objective lens 7, there is engaged a protrusion (not shown) that extends from the inner surface of a fixed cylinder (not shown) which surrounds the cylinder 38 and which guides the same back and forth therealong. On the other hand, as shown in FIG. 2, a focus switching lever 40, which is slidable in the up and down direction, is located at the front portion of the left side wall 3e of the main body housing 3. Further, as shown in FIG. 8, a part of a connection plate 41 is attached to the rear wall of this switching lever 40 and is elongated to the front of the cylinder 38 to form an elongated portion 42 and a protrusion 44 extending from the front surface of the cylinder 38 is engaged with a cut-away or recess 43 formed through this elongated portion 42, whereby when the switching lever 40 is switchably slid to the upper, neutral or lower positions, the cylinder 38 is moved back and forth and thereby the optical system of the TV camera section 5 is placed in the so-called telephoto len modes, the standard lens mode and the wide angle lens mode, sequentially.

Further, as FIG. 8 shows, a link 45 is located under the cylinder 38 and this link 45 is pivoted through a shaft 46 to the rear wall of the window frame 47 shown in (FIG. 1) that is engaged with the rear portion of the window opening 8 in the main body housing 3 so as to be moved in a seesaw-like fashion. One end of this link 45 is bent to form a bent portion 45c and this bent portion 45c is loosely engaged into a through-hole 42a that is formed through the elongated portion 42 of the connection plate 41. When the switching lever 40 is placed in the neutral (standard) position, the link 45 is placed substantially in the horizontal state as shown by the solid line in FIG. 8.

On the othe hand, as shown in FIG. 8, the dust-proof cover 9 is provided at its left and right portions of the lower end with abutting portions 48a and 48b. When the dust-proof cover 9 is slid upward to shield the front portion of the objective lens 7 as shown in FIG. 2, both of these abutting portions 48a and 48b are respectively contacted with left and right lower ends 45a and 45b of the link 45 or opposed thereto with a small clearance.

Accordingly, when the switching lever 40 is slid upward from the normal (neutral) position, the objective lens 7 is placed in the wide angle lens mode and the link 45 is inclined as shown by a two-dot chain line in FIG. 8. Under this state, if the dust-proof cover 9 is closed, the abutting portion 48a is abutted against the lower end 45a of the link 45 to thereby rotate the link 45 substantially to the horizontal position as shown by the solid line in FIG. 8. Thus, connection plate 41, or the switching lever 40 is returned to the neutral position, and hence the objective lens 7 is returned to the normal position.

Further, when the dust-proof cover 9 is opened, if the switching lever 40 is slid downward, the link 45 is inclined in the direction opposite to the above mentioned direction and the objective lens 7 is placed in the telephoto lens mode. If under this state the dust-proof cover 9 is closed, the abutting portion 48b is abutted against the lower end 45b of the link 45 and thereby this link 45 is returned substantially to the horizontal state. In other words, the switching lever 40 is returned to the neutral position. In this case, it may be possible that the lower end edge of the elongated portion 42 of the connection plate 41 is pushed upward by the abutting portion 48b.

As described above, when in the non-use mode the dust-proof cover 9 is closed, the optical system of the TV camera section 5 is placed in the standard lens mode so that in a following shooting mode, the picture will be taken in the normal mode so long as the switching lever 40 is not operated.

Within the main body housing 3, a cover opening state detection switch 50 is provided under the dust-proof cover 9. When the dust-proof cover 9 is opened, this switch 50 is switched on, by way of example.

Figure 9:
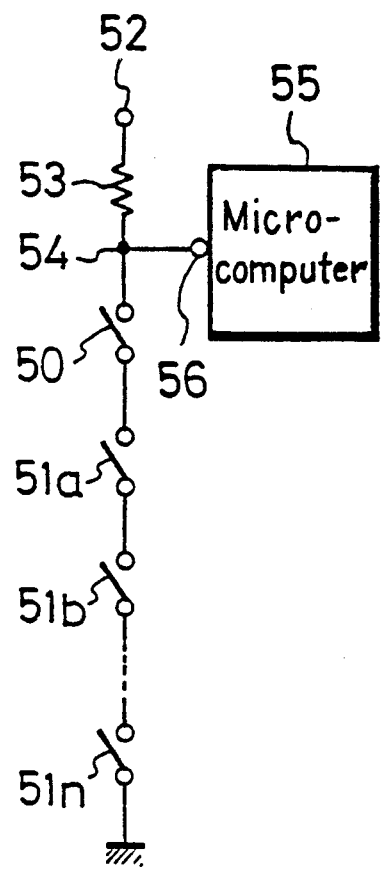
FIG. 9 is a circuit diagram showing a control circuit that controls a micro-computer used in the invention.

This switch 50 is connected in series to other switches 51a, 51b, 51c, . . . 51n, as shown in FIG. 9. These switches 51a, 51b, . . . are for example, a tape mis-erase prevention detecting switch, a switch operable by the push button 30 mentioned before, and other switches. A DC power source terminal 52 is grounded through a series circuit of a resistor 53 and the above mentioned respective switches 50, 51a, 51b . . . 51n, and a juction 54 between the series circuit of the respective switches and the resistor 53 is connected to a control terminal 56 of a micro-computer 55. This micro-computer 55 is used to control various operational statuses of the TV camera section 5 and the VTR section 6 and is not operable during a period in which the DC potential (voltage) is applied to its control temrinal 56.

Accordingly, if all the switches are turned on, or all the recording conditions are satisfied, the control terminal 56 of the computer 55 is made as a ground potential so that the micro-computer 55 is placed in the operable state.

According to the present invention as described above, since the video tape recorder having a built-in camera the main body 1 and the hand grip portion 2, which is generally located at the side wall of this main body 1, are formed to be detachable relative to each other, under this detachable state, the overall thickness of the units becomes about one-half that of the coupled state. Accordingly, if the main body 1 and the hand grip portion 2 are placed edge-to-edge on the same plane, they can be kept in a case such as the attaché case that is relatively thin. Hence, the video tape recorder having a built-in camera of the invention has an advantage that during non-use, it can be carried by the user very conveniently as a portable type.

Of coures, upon use, if the main body 1 and the hand grip portion 2 are connected with each other at their connection surfaces, they can be coupled with each other mechanically. Then, when the current is supplied from the rechargeable battery 16 to the main body 1, the shooting, or the recording can be carried on.

The above description is given on a single preferred embodiment of the invention but it will be apparent that many modifications and variations could be effected by one skilled in the art without departing from the spirit or scope of the novel concepts of the invention so that the scope of the invention should be determined by that of the appended claims only.

We claim as our invention:

1. A video tape recorder having a built-in camera comprising:
    a) a main body member containing a video tape recorder and a television camera;
    b) a hand grip member;
    c) quick disconnect coupling means for detachably mounting said hand grip member to a side wall of said main body member; and
    d) means for locking said quick disconnect coupling means, said means for locking being releasble by a lever that is accessible from the exterior of said hand grip member, said hand grip member carrying a view finder and a battery for supplying operational power to said video tape recorder and said television camera;
    e) wherein said view finder of said hand grip member is an optical type view finder which incorporates means displaying the operational status of video tape recorder and the television camera in said optical type view finder; and
    f) wherein indicators for the operational status are mounted on said main body member, and light guide means are provided whereby light from said indicators are fed to said optical type view finder.

2. A video tape recorder having a built-in camera comprising:
    a) a main body member containing a video tape recorder and a television camera;
    b) a hand grip member;
    c) quick disconnect coupling means for detachably mounting said hand grip member to a side wall of said main body member; and
    d) means for locking said quick disconnect coupling means, said means for locking being releasable by a lever that is accessible from the exterior of said grip member, said hand grip member carrying a view finder and a battery for supplying operational power to said video tape recorder and said television camera;
    e) wherein contact means is provided on said main body member and said hand grip member for electrically connecting said main body member and hand grip members when said hand grip member is mounted on said side wall of the main body member;

f) wherein indicators for the operational status of the video tape recorder and the televison camera are mounted on said main body member, and wherein light guide means are provided whereby light from said indicators are fed to said view finder.

3. A video recorder having a built-in camera comprising:
 a) a main body containing a video tape recorder and a television camera;
 b) a hand grip member;
 c) quick disconnect coupling means for detachably mounting said hand grip member to a side wall of said main body member; and
 d) means for locking said quick disconnect coupling means, said means for locking being releasable by a lever that is accessible from the exterior of said hand grip member, said hand grip member carrying a view finder and a battery for supplying operational power to said video tape recorder and said television camera;
 e) said main body member including a slidable lens cover mounted at a front wall thereof, said lens cover being open for camera use;
 f) wherein said lens cover is coupled to a switch contact, and wherein the switch contact provides a signal indicating that the lens cover is open.

4. A video tape recorder as recited in claim 3, wherein said view finder of the hand grip member is an optical type view finder.

5. A video tape recorder having a built-in camera comprising:
 a) a main body member containing a video tape recorder and a television camera;
 b) a hand grip member;
 c) quick disconnect coupling means for detachably mounting said hand grip member to a side wall of said main body member; and
 d) means for locking said quick disconnect coupling means, said means for locking being releasable by a lever that is accessible from the exterior of said hand grip member, said hand grip member carrying a view finder and a battery for supplying operational power to said video tape recorder and said television camera;
 e) said detachable mounting means comprising a plurality of spaced hook elements on one of said members and cooperating recesses on the other of said members, and at least one blocking piece carried by one of said members, said blocking piece being spring biased into engagement with a respective hook element when said hook element is within element cooperating recess to prevent disengagement of all of said hook elements from their respective recesses.

6. A video tape recorder having a built-in camera comprising:
 a) a main body member containing a video recorder and a television camera;
 b) a hand grip member;
 c) quick disconnect coupling means for detachably mounting said hand grip member to a side wall of said main body member; and
 d) means for locking said quick disconnect coupling means, said means for locking being releasable by a lever that is accessible from the exterior of said hand grip member, said hand grip member carrying a view finder and a battery for supplying operational power to said video tape recorder and said television camera;
 e) the lens of said television camera being adjustable and said main body member including a slidable lens cover mounted at a front wall thereof, said lens cover being open for camera use and upon closing returns said lens to a desired position.

7. A video tape recorder having a built-in camera comprising:
 a) a main body member having a video tape recorder and a television camera;
 b) a hand grip member;
 c) means for detachably mounting said hand grip member to a side wall of said main body member, said means for detachably mounting having a plurality of spaced hook elements on one of said members and cooperating recesses on the other of said members, and at least one blocking piece carried by one of said members, said blocking piece being spring biased into engagement with a respective hook element when said hook element is within said cooperating recess to prevent disengagement of all of said hook elements from their respective recesses; and
 d) means for locking said means for detachably mounting, said hand grip member carrying a view finder and a battery for supplying operational power to said video tape recorder and said television camera.

8. A video tape recorder having a built-in camera comprising:
 a) a main body member having a video tape recorder and a television camera, said television camera having an adjustable lens, and a slideable lens cover mounted at a front wall of said main body member, said lens cover being open for camera use and upon closing returns said lens to a desired position;
 b) a hand grip member;
 c) means for detachably mounting said hand grip member to a side wall of said main body member; and
 d) means for locking said means for detachably mounting, said hand grip member carrying a view finder and a battery for supplying operational power to said video tape recorder and said television camera.

9. A video tape recorder having a built-in camera comprising:
 a main body member having a video tape recorder and a television camera;
 a hand grip member;
 means for detachably mounting said hand grip member to a side wall of said main body, said hand grip member carrying a view finder and a battery for supplying operational power to said video tape recorder and said television camera, said view finder of said hand grip member being an optical type view finder having a means for displaying the operational status of the video tape recorder on the television camera in said optical type view finder and
 said means for displaying having indicators for the operational status which are mounted on said main body member and light guide means are provided whereby light from said indicators are fed to said optical type view finder.

10. A video tape recorder having a built-in camera comprising:

a main body member having a video tape recorder and a television camera;

a hand grip member;

means for detachably mounting said hand grip member to a side wall of said main body member, said hand grip member carrying a view finder and a battery for supplying operational power to said video tape recorder and said television camera;

contact means on said main body member and said hand grip member for electrically connecting said main body member and hand grip member when said hand grip member is mounted on said side wall of the main body member; and indicators for the operational status of the video tape recorder and the television camera, said indicators being mounted on said body member; and light guide means for guiding light from said indicators to said view finder.

11. A video tape recorder having a built-in camera comprising:

a main body member having a video tape recorder and a television camera;

a hand grip member;

means for detachably mounting said hand grip member to a side wall of said main body member, said hand grip member carrying a view finder and a battery for supplying operational power to said video tape recorder and said television camera;

a slidable lens cover mounted at a front wall of said main body member, said lens cover being open for camera use and being coupled to a switch contact wherein the switch contact provides a signal indicating that the lens cover is open.

12. A video tape recorder as recited in claim 11, wherein said view finder of said hand member is an optical type view finder.

* * * * *